United States Patent [19]
Picard

[11] Patent Number: 4,792,936
[45] Date of Patent: Dec. 20, 1988

[54] PROCESS FOR DEFINING AND MODIFYING A PARTITION OF THE STORAGE SPACE OF A NON-ERASABLE CARRIER

[76] Inventor: Michel Picard, 16 Cours du Buisson, 77186 Noisiel, France

[21] Appl. No.: 77,741

[22] Filed: Jul. 27, 1987

[30] Foreign Application Priority Data

Jul. 31, 1986 [FR] France ................................. 86 11128

[51] Int. Cl.$^4$ .......................... G11B 7/00; G11B 20/12
[52] U.S. Cl. ......................................... 369/59; 360/48
[58] Field of Search ...................... 369/59, 47, 48, 49; 360/48

[56] References Cited

U.S. PATENT DOCUMENTS 3,938,105  2/1976  Lechner .................................. 360/48
4,001,883  1/1977  Strout et al. ........................... 360/48

FOREIGN PATENT DOCUMENTS 56-977784 12/1982 Japan ..................................... 360/48

Primary Examiner—Raymond F. Cardillo
Assistant Examiner—Kevin J. Fournier
Attorney, Agent, or Firm—Nutter, McClennen & Fish

[57] ABSTRACT

A process for recording on a non-erasable information carrier such as a digital optical disk permitting an updating of the segmentation of the storage space of said carrier, in which a segmentation is defined by a header containing at least one header identifier and a list of segments, said segments forming a partition of said storage space, wherein for defining a new segmentation, a new header is written at the end of the most recent header, the successive headers being sequentially written into the same segment and wherein, for determining the current partition, there is a passage through the successive headers of the segment from the initial header to the most recent header.

7 Claims, 3 Drawing Sheets

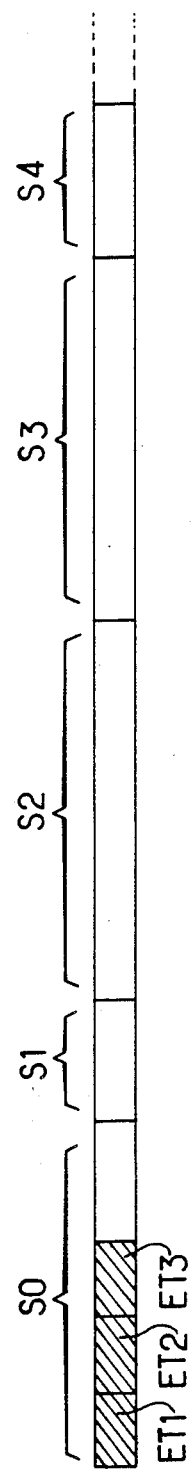
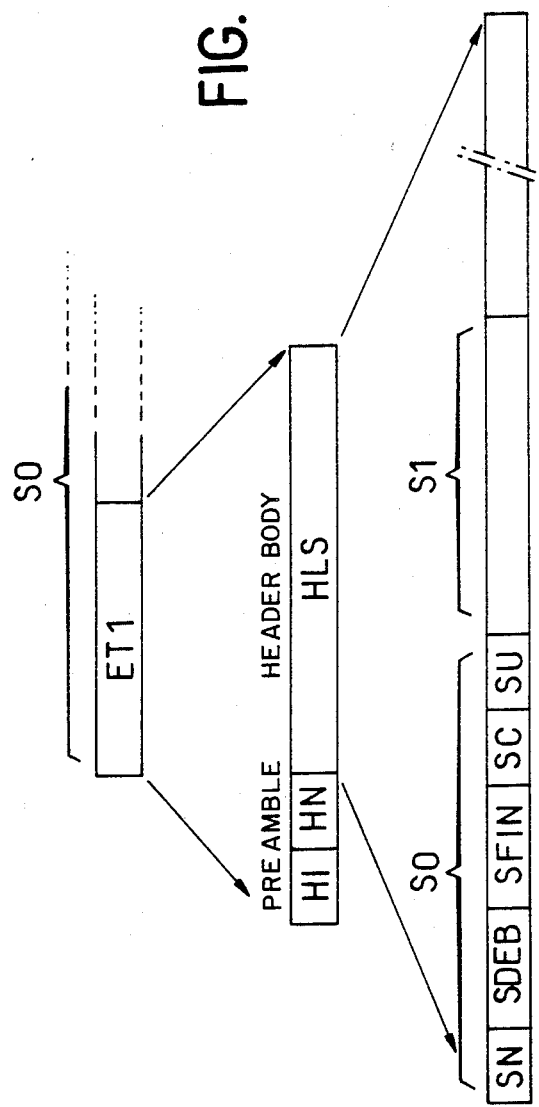

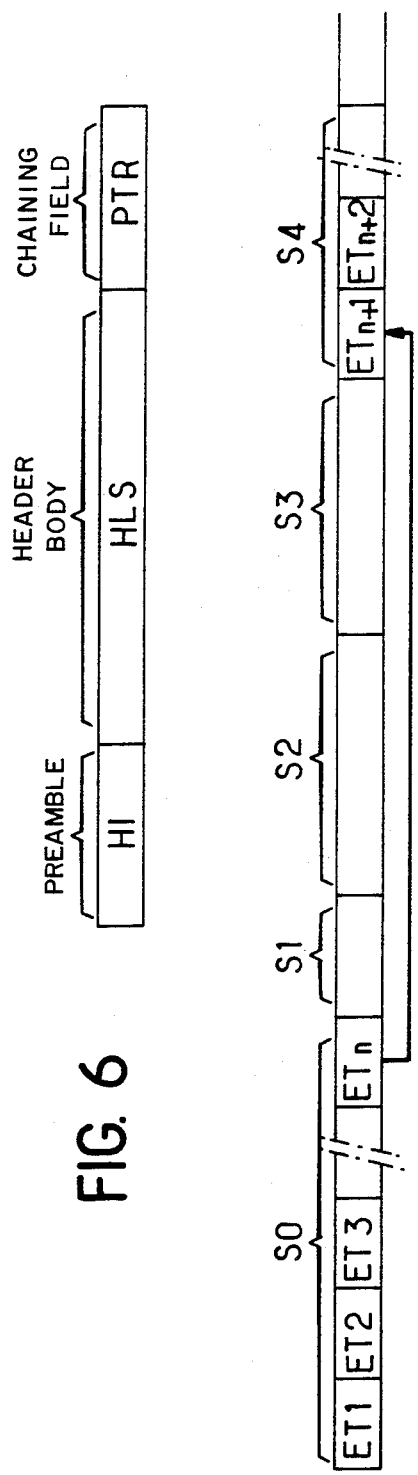
FIG. 6
FIG. 7
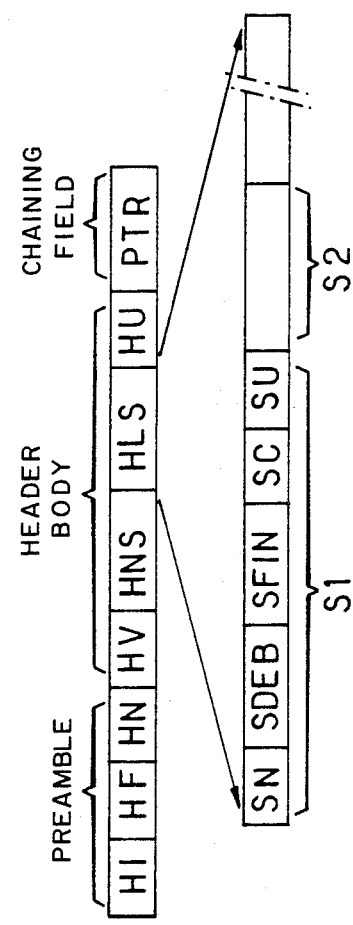
FIG. 8

PROCESS FOR DEFINING AND MODIFYING A PARTITION OF THE STORAGE SPACE OF A NON-ERASABLE CARRIER

BACKGROUND OF THE INVENTION

The present invention relates to a process for defining and modifying a partition on a storage space of a non-erasable carriers or media. The latter are in particular used for the archival storage of voluminous information, because they are not very expensive. They are increasingly used in the archival storage of digitized documents and files.

The digital optical disk is an example of a non-erasable carrier. On such a carrier it is possible to write an information at any time, but it is not possible to modify a written information. Such a carrier is said to be of the "WORM" type.

The digital optical disk is a large capacity non-erasable carrier. For an effective management or control of said large storage space, it is standard practice to subdivide it into segments of different sizes. This offers greater security and greater flexibility of use of the digital optical disk. Moreover, the digital optical disk is a detachable support which can be transported between a storage area and a reader. It must therefore be provided with reliable and transportable identification mechanisms.

Various methods are known for identifying a non-erasable carrier and for segmenting the storage space thereof.

With regards to the identification, the currently used method consists of writing a header or heading information at a precise location of the storage space, generally the first sector in the case of a non-erasable carrier organized into sectors. This header information is unique and is read back during the fitting operation of the non-erasable carrier, i.e. when the disk is loaded into a reader.

The fact of having a unique header is a disadvantage because if it is not possible to read back the location containing the header as a result of a fault on the non-erasable carrier, the header information cannot be used and cannot be regenerated. Another disadvantage is that as the header is only written once, it cannot store informations which evolve, such as the filling level of the storage space of the non-erasable carrier.

On the non-erasable carrier, the stored information is e.g. organized into files. With each file is associated two information types which are, on the one hand, the file description informations and, on the other, information representing the actual content of the file. The description information is much less voluminous than the content information.

Various methods are known for recording files on a non-erasable carrier. For each segment, said methods are based on a sequential allocation of the memory in this segment, e.g. by a sequential allocation of the sectors in the case of a digital optical disk.

According to a first known method, all the storage space of the non-erasable carrier is looked upon as a single segment. The description information and the content information are then sequentially written and are consequently interleaved in the same segment, as shown in FIG. 1.

This method suffers from at least two disadvantages. Firstly the access time to a description information is greatly increased by the passage time of the content information, which is generally voluminous. Secondly the complete sequential passage of the description information makes it necessary to pass through all the information. This passage, which can e.g. be required during the fitting of a non-erasable carrier to a reader, then requires a very considerable amount of time.

A second method is known, in which the description information and content information are stored in different segments. More precisely, the storage space of the non-erasable carrier is subdivided into two segments, as shown in FIG. 2.

The first segment starts at one of the ends of the storage space of the non-erasable carrier and the allocation of said segment takes place sequentially on the basis of this starting point. The second segment starts at the other end of the storage space of the non-erasable carrier and its allocation starts sequentially from said point.

This second method permits a more effective management of the non-erasable carrier than the first method. However, all the description information is stored in the same segment. This is not satisfactory because the description information can be of different types and volumes.

A third method is also known, in which the storage space of the non-erasable carrier is broken down into N segments, as shown in FIG. 3. This takes place during the formatting of the non-erasable carrier and cannot subsequently be further modified. This third method is of interest when it is possible to forecast from the outset the number and size of segments which will be useful. In the opposite case, this method leads to a loss of storage spaces for the carrier.

SUMMARY OF THE INVENTION

The object of the invention is to obviate the disadvantages of the known methods for identifying and segmenting a non-erasable carrier.

The invention consists of permitting an updating of the header information, by replacing the header information which has become obselete. Thus, the invention makes it possible to modify over a period of time, the segmentation of the non-erasable carrier storage space. It also makes it possible to take account in the header of information evolving during the life of the non-erasable carrier, such as the filling levels, because the invention permits the replacement of this information. Finally, it facilitates the identification of the non-erasable carrier, because a non-erasable carrier identifier can be repeated in the different versions of successive headers.

More specifically, the present invention relates to a process for recording on a non-erasable information carrier permitting an updating of the segmentation of the storage space of said carrier, in which a segmentation is defined by a header containing at least one header identifier and a list of segments, said segments forming a partition of said storage space, wherein for defining a new segmentation, a new header is written at the end of the most recent header, the successive headers being sequentially written into the same segment and wherein, for determining the current partition, there is a passage through the successive headers of the segment from the initial header to the most recent header.

According to a preferred embodiment, each header comprises a preamble containing fixed information and a header body containing variable information, the preamble containing at least the header identifier and the header body at least the list of segments associated with said header version.

In a preferred manner, when it is wished to write a new header while replacing a current header and segment containing the successive header versions is full, said new header is written into a new segment and there is a chaining between said new header and said current header.

According to a special embodiment, a chaining field is provided in each header and said header chaining field is used for linking two successive versions of the header when said header versions are located in different segments.

BRIEF DESCRIPTION OF THE DRAWINGS

The invention is described in greater detail hereinafter relative to non-limitative embodiments and the attached drawings, wherein show:

FIG. 4 A partition obtained according to the process of the invention.

FIG. 5 The header structure according to a first embodiment of the invention.

FIG. 6 The header structure according to a second embodiment of the invention, said structure making it possible to effect a chaining between two successive header versions located in different segments of the non-erasable carrier storage space.

FIG. 7 Chaining between two successive header versions.

FIG. 8 The header structure according to another embodiment of the invention.

DETAILED DESCRIPTION OF THE PREFERRED EMBODIMENTS

Figure 1:
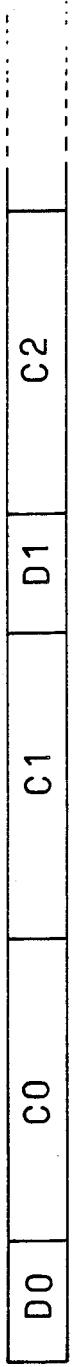
FIGS. 1 to 3, already described, partitions of a storage space of a non-erasable carrier obtained according to known recording methods.
Figure 2:
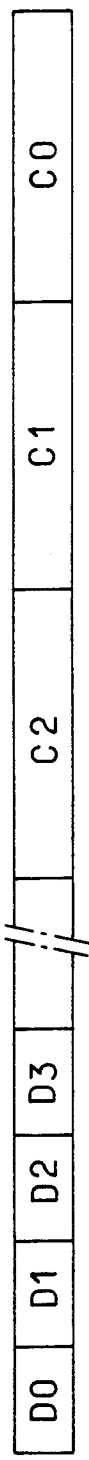
Figure 3:
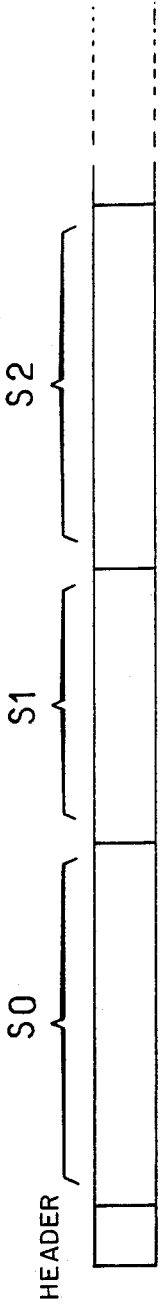

FIG. 4 shows a partition defined on a storage space of a non-erasable carrier. For example, said carrier is a digital optical disk and the storage space is then organized into sectors.

FIG. 4 shows some of the segments $S_0$, $S_1$, etc., constituting the partition of the storage space. For example, the first segment $S_0$ is reserved for the successive header versions, each version defining a particular partition of the storage space.

Among the other segments, there are segments $S_1$, $S_4$ of small size suitable for storing the description information of a file, as well as large size segments $S_2$, $S_3$ for storing the file content information.

According to the invention, the partition of the storage space of the non-erasable carrier can be modified by writing into the reserved segment $S_0$ a new header version.

In the case shown in FIG. 4, a first header version $ET_1$ has been written into the reserved segment $S_0$. This header defined a first partition of the storage space of the non-erasable carrier. For example, said header was defined at the time of formatting the non-erasable carrier.

The first partition has been modified by a second header version $ET_2$ written at the end of the first header version $ET_1$ into segment $S_0$. The partition has been changed a second time by writing a third header version $ET_3$ at the end of the second header version $ET_2$.

The possibility of modifying the partition of the storage space of the non-erasable carrier by writing in several successive header versions permits a more flexible control or management of said storage space.

The access to the most recent header version takes place simply by passing through the segment $S_0$ from the first header version. The most recent header version can be recognized because it is followed by no other header version.

FIG. 5 diagrammatically shows the header structure according to a first embodiment, in which the header is broken down into a preamble and a header body. The latter contain the information necessary for the management of the storage space of the non-erasable carrier.

The preamble comprises at least one header identifier Hi making it possible to recognise that the information is a header. It can also comprise an identifier HN containing the name of the non-erasable carrier, which permits a check during the fitting of the non-erasable carrier in a reader.

The header body comprises at least one field HLS containing the list of segments forming the partition of the storage space. Each of the segments $S_0$, $S_1$, etc. is defined at least by a starting address SDEB and a finishing address SFIN, which express the position of the segment in the storage space. Complimentary information can be added, such as the name of the segment SN, the current address SC and particular data SU indicated by the user.

The current address SC is an address between the starting address SDEB and the finishing address SFIN and indicates the first free address of the segment at the time of writing the header on the non-erasable carrier.

Obviously, at the time of writing the header in segment $S_0$, the header is completed by sync bits and redundancy bits, which are not shown in FIG. 5. The use of such bits is of a conventional nature and is well known in the art.

The inventive process has numerous advantages compared with known processes. The writing of multiple header versions guarantees the security of the informations repeated there, such as the name HN of the non-erasable carrier. Moreover, the inventive process permits the recording of time-variable data, such as dates, filling levels, etc. This makes it possible to write a definitive header version when the non-erasable carrier is completely written.

Finally, the breaking down of the storage space into segments makes it possible to separately store information of different types which, compared with known processes, leads to an improvement to the performance, the security and the flexibility of use.

The performance improvement results from the fact that it is possible to regroup the most frequently used data, such as directories, reportories, etc. in small size partitions, which can be directly loaded into a high-speed memory.

The security is also improved, because it is possible to store the most important information in one or more segments, managed by more reliable methods than for the other segments, such as information duplication or redundancy methods in segments of the same size.

The flexibility of use is also increased, because each segment can be managed by its own method and which is adapted to the nature of the data contained (image, text file, etc.). This also makes it possible to evolve the management methods by one segment in time.

It has been stated with reference to FIG. 4 that the successive header versions were written consecutively into a reserved segment $S_0$. However, it may happen that at a given time said segment is full and it is no longer possible to record a new header version there. In this case, a second segment is reserved for the recording of subsequent header versions. However, it is then necessary to provide means for linking the final header version contained in segment $S_0$ with the following header version in another segment. As shown in FIG. 6, this can be realized by the addition of a chaining field to the header body and preamble fields. This chaining field contains a pointer PTR making it possible to logically link two successive header versions written in different segments.

Such a situation is shown in FIG. 7. Segment $S_0$ contains a sequence of header versions $ET_1$, $ET_2$ ... $ET_n$, which completely fill segments $S_0$. Thus, the subsequent header versions are stored in another segment $S_4$.

The link between the header version $ET_n$ of segment $S_0$ and a following header version $ET_{n+1}$ of segment $S_4$ takes place by means of the chaining field, whilst giving to pointer PTR of header version $ET_n$ the value of the starting address of segment $S_4$.

This chaining field may only be used for the final header version of a segment. Thus, for the other header versions of a segment, the relationship between two successive header versions is immediate, because they are consecutively written into the same segment.

FIG. 8 shows another possible header structure. In this embodiment, each header comprises a preamble, a header body and a chaining field. The synchronization and redundancy informations which are added during the writing of the header in the storage space of the non-erasable carrier have not been shown.

The preamble comprises a header identifier Hi, which makes it possible to indicate that the written information is a header. A format identifier HF making it possible to indicate the type of structure according to which the information is stored on the non-erasable carrier and an identifier HN for storing the name of the non-erasable carrier are also provided.

The information contained in the preamble are fixed and permit the identification of the non-erasable carrier. The repetition of these information in the preamble of each header version constitutes a security element for the identification of the non-erasable carrier.

The header body comprises the list of segments HLS, as indicated in FIG. 5. It also comprises an identifier HV for storing the header version, an identifier HNS for indicating the number of segments constituting the partition of the storage space and optionally a data field HU reserved for the user.

The Applicant has applied the inventive process to the management or control of a digital optical disk. The values chosen in exemplified manner for the different header parameters described in FIG. 8 are:
header identifier HI: 4 bytes,
format identifier HF: 1 byte,
name of disk HN: 14 bytes,
version number HV: 2 bytes,
number of segments HNS: 2 bytes,
name of segment SN: 14 bytes,
user data SU: 10 bytes,
addresses SDEB, SFIN and SC: 4 bytes each,
user data HU: 100 bytes,
pointer PTR: 2 bytes, for indicating the index of a segment.

In this embodiment, each segment is defined by five data SN, SDEB, SFIN, SC and SU, representing a length of 36 bytes. The other elements HI, HF, HN, HV, HNS, HU and PTR have a fixed length of 123 bytes.

For a digital optical disk organized into sectors each with a length of 1024 bytes, a sector can contain a header defining a partition of the storage space into 25 segments. If the number of segments of the partition is greater, the header recording requires at least two sectors.

In summary form is given hereinafter the different possible operations on the non-erasable carrier with respect to the inventive process. In exemplified manner, it is assumed that the non-erasable carrier is a digital optical disk organized into sectors.

INITIALIZATION OF A DIGITAL OPTICAL DISK

A segment $S_0$ is reserved for the storage of successive header versions. An initial header version containing the name of the disk HN, at least segment $S_0$ and a version index $HV=1$ is written at the starting address of segment $S_0$.

FITTING A DIGITAL OPTICAL DISK

Fitting consists of positioning at the starting address of segment $S_0$, followed by the successive reading of the header versions. The most recent version is that immediately followed by an unoccupied sector. If the non-zero header chaining field is encountered, reading is continued on the segment designated by this field. The program effecting the fitting receives as a parameter the name of the disk and checks that the field HN contains this name.

FORMATION OF A HEADER VERSION

A new header version can be formed following the fitting operation. The value HV is incremented by 1. The header information is written at the current address SC of the header segment (segment 0 if there is no chaining). In the new header version, said current address is increased by the length of this new header version.

FORMATION OF A SEGMENT

The formation of a segment consists of filling in each of these fields (SN, SDEB, SFIN, SC and SU), then adding 1 to the number of segments HNS, followed by the formation of a new header version. The simultaneous formation of several segments gives rise to the formation of a single header version.

OPENING A SEGMENT

The opening of a segment takes place on the indication of its name (SN) or its rank in the list of segments (HLS). It is assumed that the fitting of the digital optical disk has taken place beforehand. It gives rise to the location of the current address between address SC and address SFIN.

LOCATING THE CURRENT ADDRESS

The current address of a segment corresponds to the first unoccupied sector of said segment in the case where writing takes place by sequential allocation of the sectors of address SDEB to address SFIN.

The location of the current address is accelerated by taking as the starting point address SC obtained during the opening of the segment. The value of SC is equal to the real current address if there has been no writing in the segment since the formation of the last header version. In the opposite case it is lower.

WRITING IN A SEGMENT

Writing in a segment which has previously been opened takes place at the current address and for a whole number N of sectors. The current address is then increased by N sectors. When the finishing address SFIN is reached, the segment is full and no further writing there is possible.

READING IN A SEGMENT

Reading in a previously open segment takes place between addresses SDEB and SFIN. The addresses can be expressed in absolute manner (displacement relative to the start of the disk) or in relative manner (displacement relative to SDEB). Attempted reading outside the segment returns an error code.

What is claimed is:

1. A process for recording on a non-erasable information carrier permitting an updating of the segmentation of the storage space of said carrier, in which a segmentation is defined by a header containing at least one header identifier and a list of segments, said segments forming a partition of said storage space, wherein for defining a new segmentation, a new header is written at the end of the most recent header, the successive headers being sequentially written into the same segment and wherein, for determining the current partition, there is a passage through the successive headers of the segment from the initial header to the most recent header.

2. A process according to claim 1, wherein each header version comprises a preamble containing fixed information and a header body containing variable information, the preamble containing at least the header identifier and the header body containing at least the list of segments associated with said header version.

3. A process according to claim 1, wherein, for the writing of a new header to replace the current header, when the segment containing the successive header versions is full, the new header is written in another segment and chaining takes place between the new header and the current header.

4. A process according to claim 3, wherein each header also comprises a chaining field and wherein use is made of said chaining field for linking two successive header versions, when said header versions are located in different segments.

5. A process according to claim 2, wherein the preamble also comprises a format identifier for indicating the structure of the information contained on the non-erasable carrier and a parameter for indicating the name of said non-erasable carrier.

6. A process according to claim 2, wherein the header body also comprises a parameter HV for indicating a header version number, a parameter HNS for indicating the number of segments defined on the non-erasable carrier and for each segment a parameter SN for indicating the name of the segment and a parameter SC for indicating the current writing address on forming the header version.

7. A process according to claim 1, wherein the non-erasable carrier is a digital optical disk, whereof the storage space is organized into sectors.

* * * * *